US010039976B2

(12) United States Patent
Kim

(10) Patent No.: US 10,039,976 B2
(45) Date of Patent: Aug. 7, 2018

(54) PROTECTIVE CASE FOR MOBILE TERMINAL PROVIDING REAL-TIME VIBRATION FEEDBACK

(71) Applicant: Jung-Hoon Kim, Daegu (KR)

(72) Inventor: Jung-Hoon Kim, Daegu (KR)

(*) Notice: Subject to any disclaimer, the term of this patent is extended or adjusted under 35 U.S.C. 154(b) by 0 days.

(21) Appl. No.: 15/553,485

(22) PCT Filed: Dec. 11, 2015

(86) PCT No.: PCT/KR2015/013612
§ 371 (c)(1),
(2) Date: Aug. 24, 2017

(87) PCT Pub. No.: WO2016/153148
PCT Pub. Date: Sep. 29, 2016

(65) Prior Publication Data
US 2018/0028909 A1 Feb. 1, 2018

(30) Foreign Application Priority Data

Mar. 23, 2015 (KR) .................. 10-2015-0040249
Apr. 16, 2015 (KR) .................. 10-2015-0053907
(Continued)

(51) Int. Cl.
*H04M 1/00* (2006.01)
*H04B 1/38* (2015.01)
(Continued)

(52) U.S. Cl.
CPC ............ *A63F 13/285* (2014.09); *A45C 11/00* (2013.01); *A63F 13/92* (2014.09); *A63F 13/98* (2014.09);
(Continued)

(58) Field of Classification Search
CPC ...... H04M 1/04; H04M 1/0262; H04M 1/185; H04B 1/3888
(Continued)

(56) References Cited

U.S. PATENT DOCUMENTS 7,418,278 B2* 8/2008 Eriksson ............. H04M 1/0202
277/628
8,116,506 B2* 2/2012 Kuroda .................... H04R 1/02
381/107
(Continued)

FOREIGN PATENT DOCUMENTS

KR 10-0970574 B1 7/2010
KR 20-0456228 A 10/2011
(Continued)

*Primary Examiner* — Quochien B Vuong
(74) *Attorney, Agent, or Firm* — Maschoff Brennan

(57) ABSTRACT

The present invention relates to a protective case for preventing damage to a mobile terminal, comprising: an actuator (12) comprising a piezoelectric vibrating screen (17) formed by attaching a piezoelectric element layer (20) to at least one side of a substrate (18), at least one or more weight pieces (22) which are fixedly attached to the piezoelectric element layer (20) and increase the vibration force, and a bracket (24) provided so that both ends of the substrate (18) are fixedly attached thereto; an auxiliary battery (10) which supplies power to the actuator (12) and is used for charging in the case where a battery of a mobile terminal (4) is discharged or consumed; and a Bluetooth receiving module (30) for receiving a signal transmitted from a Bluetooth transmitting module (28) of the mobile terminal (4). As the actuator (12), which provides real-time vibration feedback, is installed in the inner side of the protective case (2)(2*a*) which is worn for preventing damage to the mobile terminal (4), the protective case has an effect of giving a user simultaneous sensory stimulation by providing the user with a haptic signal corresponding to an image and sound out-
(Continued)

putted from the mobile terminal (4) as a rapid vibration response. In addition, the protective case can transfer various vibration patterns including strong vibration and micro vibration as the vibration amount of the actuator (12) is adjusted according to the magnitude of vibration, or a vibration motor (14) is controlled so as to provide vibration feedback at low frequency, and thus, the protective case has an effect of giving the user a sense of realism.

24 Claims, 6 Drawing Sheets

(30) Foreign Application Priority Data

| | | |
|---|---|---|
| May 11, 2015 | (KR) | 10-2015-0065487 |
| Jun. 19, 2015 | (KR) | 10-2015-0087530 |
| Nov. 18, 2015 | (KR) | 10-2015-0161959 |

(51) Int. Cl.

| | |
|---|---|
| *A63F 13/285* | (2014.01) |
| *A45C 11/00* | (2006.01) |
| *A63F 13/92* | (2014.01) |
| *A63F 13/98* | (2014.01) |
| *H04M 1/02* | (2006.01) |

(52) U.S. Cl.
CPC ..... *H04M 1/0202* (2013.01); *A45C 2011/002* (2013.01); *H04M 1/0262* (2013.01)

(58) Field of Classification Search
USPC .................. 455/90.3, 550.1, 575.1, 575.8
See application file for complete search history.

(56) References Cited

U.S. PATENT DOCUMENTS

| | | | | |
|---|---|---|---|---|
| 8,417,303 | B2* | 4/2013 | Ladouceur | H01H 9/04 |
| | | | | 455/575.8 |
| 8,787,009 | B2* | 7/2014 | Wilson | H04M 1/185 |
| | | | | 455/550.1 |
| 8,890,823 | B2* | 11/2014 | Alameh | G06F 3/038 |
| | | | | 455/566 |
| 2010/0078343 | A1* | 4/2010 | Hoellwarth | B29C 45/14639 |
| | | | | 206/320 |

FOREIGN PATENT DOCUMENTS

| | | |
|---|---|---|
| KR | 10-2012-0110669 A | 10/2012 |
| KR | 10-1197251 A | 11/2012 |
| KR | 10-1369517 B1 | 3/2014 |
| KR | 10-2014-0097049 A | 8/2014 |
| KR | 10-1502272 B1 | 3/2015 |

* cited by examiner (a)

(b)

PROTECTIVE CASE FOR MOBILE TERMINAL PROVIDING REAL-TIME VIBRATION FEEDBACK

TECHNICAL FIELD

The present invention relates to a protective case for mobile terminal and, more particularly, to a protective case for a mobile terminal for transferring a vibration haptic signal corresponding to an image and sound outputted from the mobile terminal in real-time.

BACKGROUND ART

These days, as the virtual reality implementation technology is developed, a user has been forced to want more detailed and realistic information through virtual reality. One of things developed to satisfy the need is a haptic technology which transfers both a sense of touch and force. A simple haptic technology may include a notification function using a vibration motor and is also widely applied to several fields, in addition such as a medical simulator and a game machine etc.

In the future, a haptic device together with a monitor and a speaker are likely to be basically mounted as an output device of a computing device. The reason for this is that there are advantages in that a user's tactile recognition is high and an interoperability with an IT device is excellent by the haptic device installed within a portable electronic device.

Meanwhile, a mobile terminal are taking advantages of portability and to become miniaturization, slivering, grip, and lightening trends by taking portability into consideration and is developed toward multimedia ways in which various functions can be executed. For example, this may become a device which enables a user to perform communication with a counterpart through wireless communication while a user portable the device or a mobile game machine etc., such as Sony PSP or Nintendo DS.

Recently, a mobile terminal have a various functions, such as a smartphone, is being released. A high-performance speaker is installed and one vibration motor is mounted for vibration transfer on such a smartphone.

Furthermore, in order to protect damage to a smartphone that is an expensive mobile terminal, a protective case for a mobile terminal is covered on the outside of the smartphone.

The protective case for a mobile terminal may be formed in the form of a pouch or a protective skin that surrounds the outside surface of a portable electronic device, and can preventing damage attributable to an impact by reducing from the external applied impact. The protective case may be made of a hard or soft materials and may be fabricated in various shapes according to a shape and magnitude so that it is closely attached to the mobile terminal.

Recently, the protective case for a mobile terminal is also developed in a form having a various functions in addition to the protection of damage to a portable electronic device.

For an example, Korean Registration Patent No. 10-970574 has been disclosed "Game Accessory for Mobile Instrument (prior art document)"

In the prior art document, a vibration motor and a large-sized battery are installed in the inner side of the game accessory for mobile instrument, when a user play game is using the mobile device, vibration operating in conjunction with a sound is provided and the large-sized battery is used if the battery of the mobile device is discharged.

However, a linear vibration motor having a rather slow response time is used as the vibration motor disposed in the prior art document. Such a vibration method is insufficient to make a user simultaneous sensory stimulation due to the slow response time, and the form of vibration also remains in simple vibration.

Furthermore, the vibration motor has a little complicated configuration because it has to convert an analog sound source into a digital signal for motor driving to generate vibration that operating in conjunction with a sound.

Moreover, a response time during which a person can feel a simultaneous vibration sense along with visual information must be below 15 ms, but the vibration device of the linear motor method has a response time of 50~70 ms and is slow in giving a user simultaneous sensory stimulation. A coin type rotary type motor, that is, another example of the vibration motor, has a very slow response time of 100~150 ms and is merely used for only a notification function for reception.

A tow plane linear motor, that is, another linear motor, is a vibrator using a lateral force fields (LFFs) phenomenon. Furthermore, the plane linear motor has a slowly response time of 50~70 ms because it is a linear motor using a coil and a magnet, and is thus insufficient in implementing a haptic effect.

As described above, the conventional linear motor and coin type rotary type motor fall into a booming noise phenomenon attributable to a vibration redundancy effect when vibration is continuously generated because the response time and the stop time are slow. Accordingly, simultaneous sensory stimulation corresponding to visual information cannot be felt because a difference between first delivered vibration and subsequently delivered vibration is ambiguous. Furthermore, various vibration patterns, such as strong vibration and micro vibration etc., for a haptic function implementation, cannot be controlled with a very rapid response time.

In the future, as PC game, console game, etc. trend to gradually switch to mobile game, a haptic effect through a mobile terminal may become an important factor. Accordingly, implement a haptic function in a mobile terminal, such as a smartphone having various functions, a rapid response time and precise control of vibration is required and there is a need to develop a haptic technology suitable for game that becomes gradually higher performed.

DISCLOSURE OF INVENTION

Technical Problem

Accordingly, the present disclosure provides a protective case for a mobile terminal providing real-time vibration feedback, which is corresponding to an image and sound outputted from a mobile terminal so that a user can feel simultaneous sensory and a sense of realism with various amounts of vibration attributable to a rapid response time and variable vibration.

Technical Solution

According to an exemplary embodiment of the present disclosure, a protective case for a mobile terminal may include an actuator 12 including a piezoelectric vibrating screen 17 formed by attaching a piezoelectric element layer 20 to at least one side of a substrate 18, at least one—weight piece 22 which is fixedly attached to the piezoelectric element layer 20 and increases the vibration force, and a bracket 24 provided so that both ends of the substrate 18 are fixedly attached thereto; an auxiliary battery 10 which supplies power to the actuator 12 and is used for charging in the case where the battery of a mobile terminal 4 is discharged or consumed; and a Bluetooth receiving module 30 for receiving a signal transmitted by the Bluetooth transmitting module 28 of the mobile terminal 4.

Furthermore, an exemplary embodiment of the present disclosure provides a protective case for a mobile terminal that may include an actuator 12 including a piezoelectric vibrating screen 17 formed by attaching a piezoelectric element layer 20 to at least one side of a substrate 18, at least one—weight piece 22 which is fixedly attached to the piezoelectric vibrating screen 17 and increases the vibration force, and a bracket 24 provided so that both ends of the substrate 18 are fixedly attached thereto; an auxiliary battery 10 which supplies power to the actuator 12 and is used for charging in the case where the battery of a mobile terminal 4 is discharged or consumed; and a sound input 46 receiving a signal transmitted by the sound output 44 of the mobile terminal 4.

Furthermore, an exemplary embodiment of the present disclosure provides a protective case for a mobile terminal that may include an actuator 12 including a piezoelectric vibrating screen 17 formed by attaching a piezoelectric element layer 20 to at least one side of a substrate 18, at least one weight piece 22 which is fixedly attached to the piezoelectric vibrating screen 17 and increases the vibration force, and a bracket 24 provided so that both ends of the substrate 18 are fixedly attached thereto; an auxiliary battery 10 which supplies power to the actuator 12 and is used for charging in the case where the battery of a mobile terminal 4 is discharged or consumed; and a connector 36 for changing the internal battery of the mobile terminal 4 and for data transmitted between the protective case 2 for a mobile terminal and the mobile terminal 4.

Advantageous Effects

The present invention, as the actuator, which can be provided real-time vibration feedback, is installed in the inner side of protective case which is worn for preventing damage to the mobile terminal, the protective case has an effect of giving a user simultaneous sensory stimulation by providing the user with a haptic signal corresponding to an image and sound outputted from the mobile terminal as a rapid vibration response.

Furthermore, the present invention can be provided the protective case can transfer various vibration patterns including strong vibration and micro vibration as the vibration amount of the actuator is adjusted according to the magnitude of sound, or vibration motor is controlled so as to provide vibration feedback at low frequency, and thus, the protective case has an effect of giving the user a sense of realism.

Furthermore, the present invention has an effect in that the continuous operation of a multimedia function, such as online game, is possible because an auxiliary battery can be replaced in the state in which the operation of a mobile terminal remains intact when a battery is used up.

Furthermore, the present invention has an effect in that a multimedia function can be used without a reduction in the function of a mobile terminal because the radiant heat member and cooling part for reducing heat generated by the mobile terminal are installed in the inner side of the protective case for a mobile terminal.

DETAILED DESCRIPTION OF THE EMBODIMENTS

The present invention will be described fully hereinafter with reference to the accompanying drawings, in which preferred exemplary embodiments of the invention are shown.

Figure 1:
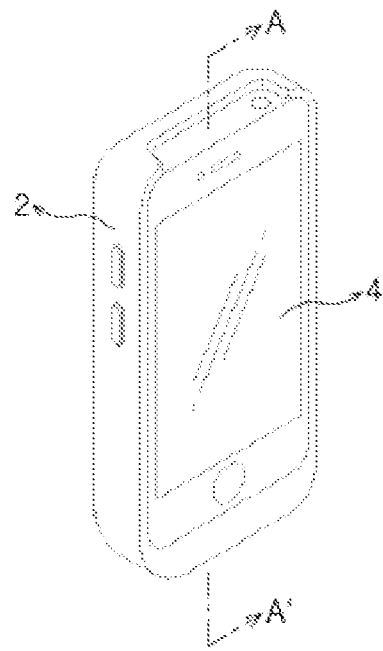
FIG. 1 is a perspective view of a protective case for a mobile terminal providing real-time vibration feedback according to an exemplary embodiment of the present invention.

FIG. 1 is a diagram showing the state in which a protective case 2 for a mobile terminal of the present invention has been fastened to a mobile terminal 4.

The protective case 2 for a mobile terminal of the present invention is preferably coupled to the mobile terminal 4, a smartphone and is to provide a haptic signal to a user using a signal transferred from the mobile terminal 4 while preventing damage from an impact applied to the mobile terminal 4.

In general, haptic is a technology which enables a user to feel a sense of touch and a force, a sense of movement corresponding to an image and sound outputted from the mobile terminal 4 of a user. In the present invention, a sense of touch of vibration feedback is transferred to a user through the haptic technology so that giving the user a sense of realism and a simultaneous sensory stimulation.

Figure 2:
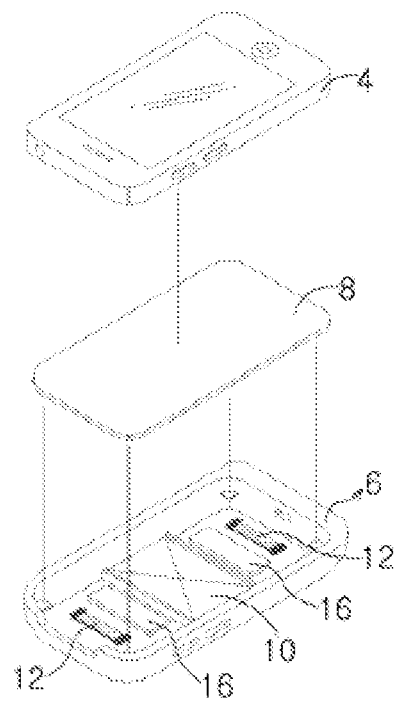
FIG. 2 is an exploded perspective view of FIG. 1.
Figure 3A:
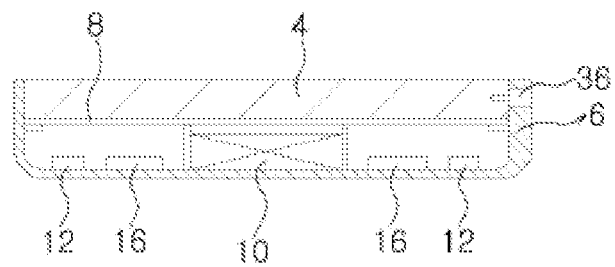
FIG. 3a shows the configuration of a cross-sectional view of A-A' of FIG. 1.

To this end, in the present invention, like as in FIGS. 2 to 3a, the protective case 2 for a mobile terminal is configured, which may includes a body 6 that a high capacity of an auxiliary battery 10, at least one of an actuator 12 that transferred vibration feedback, and a control module 16 is installed the current control of the auxiliary battery 10 and signal control of the actuator 12 are installed in the inner side of the body 6, and a cover 8 for seating the mobile terminal 4 is installed on the top.

Furthermore, a connector 36 for charging the internal battery of the mobile terminal 4 may be provided at one side of the protective case 2 for a mobile terminal in which the mobile terminal 4 has been seated.

The connector 36 may be a detachable form. The connector 36 may be separated from the mobile terminal 4 and kept on one side of the protective case 2 for a mobile terminal at normal times and may be inserted into the charging terminal of the mobile terminal 4 to charge the mobile terminal 4.

In the present invention, the connector 36 may be installed to freely move up and down so that the mobile terminal 4 can be easily inserted into the protective case 2 for a mobile terminal.

When the mobile terminal 4 is coupled to the protective case 2, the connector 36 may be first inserted into the charging terminal of the mobile terminal 4 before the mobile terminal 4 and the protective case 2 are fully coupled because a movement of the connector 36 inserted into the charging terminal of the mobile terminal 4 is free. Accordingly, the mobile terminal 4 and the protective case 2 can be easily coupled.

Figure 4:
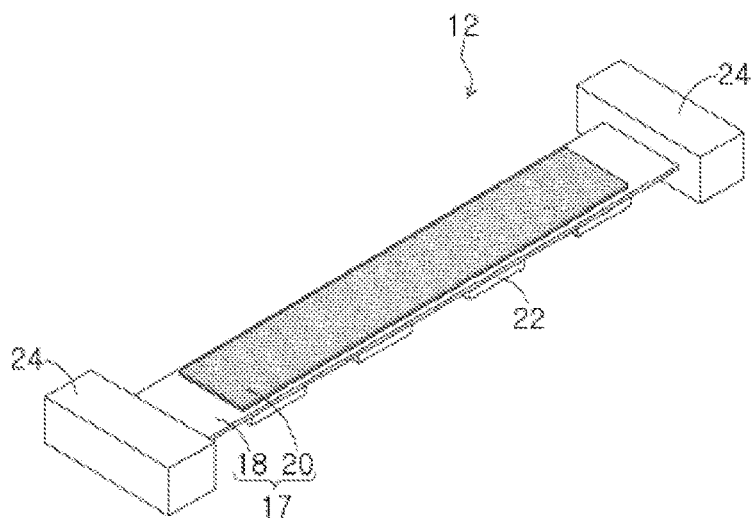
FIG. 4 is a perspective view showing the configuration of an actuator according to an exemplary embodiment of the present invention.
Figure 5:
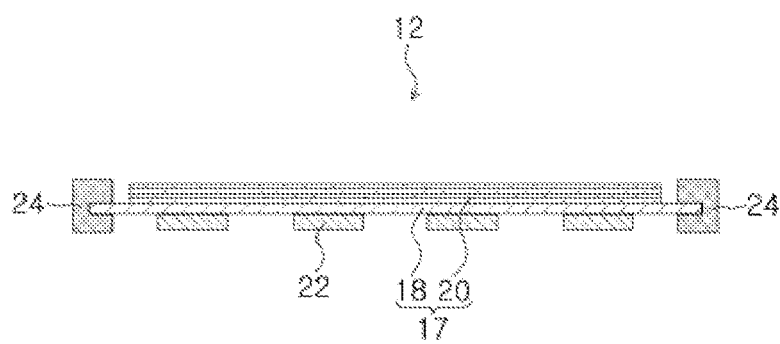
FIG. 5 shows the configuration of a cross-sectional view of an actuator according to an exemplary embodiment of the present invention.

The actuator 12 may be formed of a piezoelectric element vibration device using piezoelectric ceramic as shown in FIGS. 4 to 5.

The configuration of the actuator 12 of the present invention is described. The actuator 12 includes a piezoelectric vibrating screen 17 formed by attaching a piezoelectric element layer 20 to at least one side of substrate 18, at least one weight pieces 22 which is fixedly attached to the piezoelectric vibrating screen 17 and increases the vibration force, and a bracket 24 provided so that both ends of the substrate 18 are fixedly attached thereto.

The actuator 12 may be installed in the protective case 2 for a mobile terminal in the state in which the actuator 12 has been protected by a separate case 26 in order to prevent damage attributable to falling impact.

Figure 6:
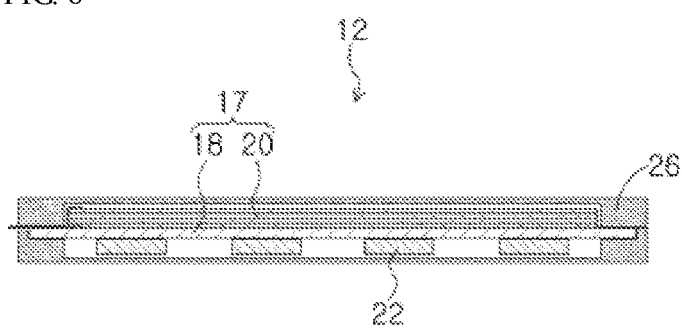
FIG. 6 shows the configuration of a cross-sectional view of an actuator according to another exemplary embodiment of the present invention.

As shown in FIG. 6, if the case 26 is attached and disposed to surround the entire actuator 12, the amount of vibration is increased, the noise attributable to vibration is reduced, and the case 26 functions to absorb an impact when falling impact are generated because the bending displacement of the piezoelectric element layer 20 is not limited, thereby being capable of effectively preventing damage to the actuator 12.

The case 26 may be formed using a soft material, such as natural rubber or synthetic rubber. Specifically, silicon, neoprene, EPDM, fluoro rubber, acrylic rubber, etc. of the synthetic rubber may be used. In addition, any elastic material, such as soft synthetic resin, may be used.

In another exemplary embodiment of the present invention, the bracket 24 may be formed using a soft material. A module case (not shown) in which the actuator 12 can be inserted and installed may be provided.

If the substrate 18 is fixed using a material having elasticity, such as the bracket 24 or the case 26 as described above, a separate resonant frequency band is not generated because a movement of the substrate 18 is not restricted, thereby enabling free vibration suitable for an input frequency.

Furthermore, if the actuator 12 is inserted and installed in the inner side of the module case, damage to the actuator 12 attributable to falling impact can be prevented, and an adhesion area is widened because the entire module case is attached and installed. Accordingly, the actuator 12 can be stably fixed and thus an installation work is convenient.

The module case may be formed using a material, such as aluminum, stainless, an iron plate, a separate synthetic resin molded article, etc.

Referring back to FIG. 2, in the present invention, the actuator 12 of a piezo method is installed in the protective case 2 for a mobile terminal to transfer vibration feedback. Accordingly, a sense of realism and a simultaneous sensory stimulation can be provided to a user.

In general, a linear type vibration motor is used as a vibration device used in the mobile terminal 4, and the conventional linear type vibration motor has the following problems.

The linear type vibration motor cannot transfer a user simultaneous sensory stimulation by providing the user with a corresponding to outputted so that a slow response time. The linear type vibration motor has a response time of 50~70 ms and a residual vibration time of 70~100 ms, which are slow in feeling a simultaneous sensory stimulation. Accordingly, the linear type vibration motor cannot transfer real-time vibration feedback corresponding to output image and sound.

A response time during which a person can feel simultaneous sensory stimulation is within 15 ms. Vibration feedback slower than the response time of 15 ms is insufficient for a user to feel a simultaneous sensory stimulation because a person has feeling as if vibration is late followed after the person recognizes an image and sound.

The linear type vibration motor is insufficient to transfer rapid vibration of a high frequency band in real-time, but can be used to transfer slow vibration in a low frequency band.

The actuator 12 of the present invention enables variable vibration according to the shift of a frequency within a wide range unlike in the case where maximum vibration is secured by setting a fixed frequency as in an existing vibration motor from the unique nature of a piezo method.

The piezoelectric ceramic actuator 12 has a fast response time and can detailed control the size and speed of vibration by controlling a frequency within a wide range. Accordingly, a delicate and simultaneous vibration effect matched with an image and sound can be felt.

Piezoelectric ceramic has a response time of 5-8 ms and less, and enables a real-time response, making a user feel a simultaneous sensory stimulation. The piezoelectric ceramic is controlled within a wide frequency band (for example, 1~300 Hz) so that it is variably vibrated, thereby being capable of freely implementing the amount of vibration and thus increasing a sense of realism according to a vibration response.

Furthermore, the piezoelectric actuator 12 of the present invention does not generate electromagnetic noise when it operates.

In general, vibration devices using a motor generate noise attributable to a signal or resistance. If the vibration device is installed within an accurate electronic product, such as a smartphone, it is apprehended that such noise may generate malfunction because it affects the operation of the device.

In the present invention, noise, such as that described above, is not generated because the piezoelectric ceramic actuator 12 is adopted as a vibration device. Accordingly, there is no concern of a malfunction of an electronic product in which the actuator 12 has been installed.

Furthermore, a haptic effect using the actuator 12 of the present invention can use the frequency of an analog sound, provided by the mobile terminal 4, as vibration without any change.

In order to provide vibration according to the operation of a motor, a conversion circuit for converting an analog sound into a digital signal must be configured. This makes complicated the configuration of a control circuit for vibration and makes slower a vibration response because the RPM of the motor needs to be faster toward a high frequency band, resulting in inefficiency.

For example, in the case of the rotary type vibration motor, in order to transfer vibration having a frequency of 200 Hz, the motor has to rotate 12,000 RPM. In order for the vibration to suddenly change to vibration having a frequency of 300 Hz, the motor has to increase to 18,000 RPM. Such an increase in the RPM of the motor physically increases the number of revolutions of the motor, inevitably making slow a response time.

Furthermore, in the case of the linear vibration motor, when polarity is changed by changing the direction of current applied to the coil, the magnet linearly moves forth and back by gravitation or repulsion. When the weight moves along with the magnet, linear vibration is generated. The linear vibration motor generates response delay attributable to acceleration when the weight performs a rectilinear movement up and down or left and right. Such response delay becomes further worse in a high frequency band, and thus a vibration response time may also become slow.

In the present invention, a haptic effect according to vibration is provided using the actuator 12 of a piezo method. Accordingly, separate digital conversion is not required, and an analog sound generated in game can be transferred as vibration without any change.

In order to connect and transfer the frequency of an analog sound as vibration without any change, a Piezo Haptic Drive IC, etc. has been developed by various semiconductor companies. Accordingly, the present invention adopts the piezo haptic drive IC and can provide vibration.

Furthermore, for vibration using a special effect sound, a digitally produced waveform (sine, square, saw, pulse) can be generated and vibration can be provided. Haptic software fabricated by Immersion Corp. (U.S.A) may be used as haptic software for vibration using a special effect sound.

The form of the actuator 12 shown in the drawings of the present invention is not limited. The actuator 12 may be configured using a vibration device made of various piezoelectric elements, such as a unimorph type, a bimorph type, a multi-morph type etc.

Figure 7:
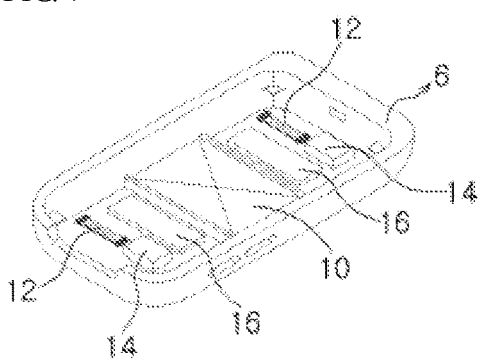
FIG. 7 is a cross-sectional view showing another configuration of a protective case for a mobile terminal of the present invention.

In the present invention, as in FIG. 7, a vibration motor 14, together with the actuator 12, may be installed to transfer various vibration signal to a user.

In order to represent fast vibration having a change of the amount of vibration in a high frequency band, vibration is transferred by the actuator 12. In order to represent slow vibration in a low frequency band of 100 Hz and less, vibration is transferred by the vibration motor 14.

A cylinder type vibration motor 14, that is, an example of the vibration motor 14, is a rotary type vibration motor, but has the volume versus the rotation radius of a weight much smaller than that of a coin type rotary type motor. Accordingly, the cylinder type vibration motor has an excellent response time of 40~50 ms and less and is also capable of variable vibration because a resonant frequency band is not fixed.

For example, in order to transfer minute vibration like background music or a heat beat to a user, the vibration may be transferred by controlling the actuator 12. Both the actuator 12 and the vibration motor 14 may be used to transfer slow and large vibration, such as the engine sound of a vessel, a tank sound, etc., or the vibration motor 14 may be solely used to transfer the vibration.

In the present invention, a three-dimensional structure effect according to multiple vibration can be felt because the at least one actuator 12 is installed in the inner side of the protective case 2 for a mobile terminal.

In general, since one vibration motor is installed within the mobile terminal 4, vibration is generated at one point only. Accordingly, a three-dimensional structure haptic effect according to multiple vibration cannot be expected.

Furthermore, due to the characteristics of the smartphone, an installation space is not sufficient in installing several vibration motors. Although several vibration motors are installed in the smartphone, current consumption is increased due to the plurality of vibration motors. A device malfunction attributable to the generation of noise may be caused because vibration is generated using the vibration motors.

In the present invention, the same effect as that vibration moves can be felt because the actuator 12 are installed in series or in parallel in the inner side of the protective case 2 for a mobile terminal and controlled so that vibration is sequentially transferred.

For example, if the actuator 12 installed from left to right or top to bottom are independently controlled so that they sequentially provide vibration feedback, a sense of realism can be improved because the same three-dimensional structure vibration as that vibration is moved by multiple vibration can be felt.

Installing the actuator 12 in the protective case 2 for a mobile terminal of the present invention, the actuator 12 may be installed by forming at least one insertion groove (not shown) for inserting and installing the actuator 12 in the protective case 2.

The insertion groove may be previously formed when the protective case 2 is injected and fabricated. When the actuator 12 is inserted and installed in the insertion groove, the location of the actuator 12 can be easily determined so that vibration feedback can be provided from a desired location of the protective case 2 in which a plurality of the insertion grooves has been formed.

In case the actuator 12 is inserted and installed in the insertion groove, a contact terminal (not shown) may be installed at one side of the actuator 12 so that the contact terminal comes into contact with a socket for conduction (not shown) installed in the insertion groove when the contact terminal and the socket for conduction are coupled, thereby applying a driving voltage.

The protective case 2 for a mobile terminal of the present invention may include the auxiliary battery 10 separately from the internal battery of the mobile terminal 4.

When a multimedia functions, such as games are operated, current consumption of the mobile terminal 4 is great, and thus there is inconvenience because the internal battery has to be frequently charged.

In the present invention, the auxiliary battery 10 may be used for charging when the internal battery of the mobile terminal 4 is discharged or the internal battery is used up. In order to drive the actuator 12 and the vibration motor 14 installed in the protective case 2, an electric current may be supplied through the internal battery of the mobile terminal 4. Furthermore, an electric current may be supplied from the auxiliary battery 10 installed in the protective case 2 for a mobile terminal to the actuator 12.

Figure 3B:
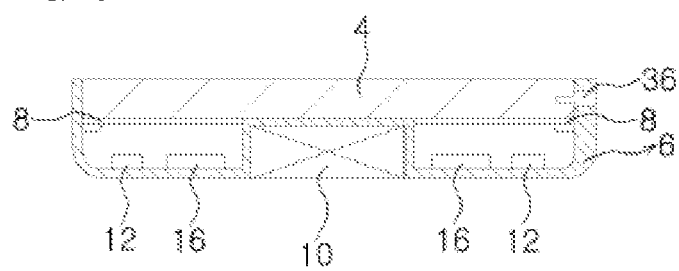
FIG. 3b is a diagram showing the mounting structure of an external battery in the inner side of the protective case for a mobile terminal of the present invention.

In the present invention, as shown in FIG. 3b, the auxiliary battery 10 installed in the protective case 2 for a mobile terminal may be detachable disposed in such a way as to be replaced.

If a user uses a multimedia function, such as game, for a long time while carrying the mobile terminal 4, such as a battery replacement type smartphone, the user has to insert a new battery into the mobile terminal 4 in the state in which the mobile terminal 4 has been temporarily turned off in order to replace the battery of the mobile terminal 4 with the new battery when the battery is used up. A charging cable has to be connected to the mobile terminal 4, such as a battery-embedded type smartphone.

In particular, the mobile terminal cannot be continuously used because game must be stopped in order to replace the battery when a multimedia function, such as online game, is used. It is difficult to freely use the mobile terminal because a separate charging cable must be connected to deteriorate portability.

In the present invention, when a multimedia function is used, the auxiliary battery 10 provided in the protective case 2 for a mobile terminal is used. Furthermore, when the current of the auxiliary battery 10 is fully consumed, the auxiliary battery 10 configured in a detachable type can be replaced, thereby enabling a continuous multimedia operation.

In this case, a multimedia function, such as online game, can continue to operate without being stopped because the internal battery of the mobile terminal 4 is used when the auxiliary battery 10 is replaced.

Figure 3C:
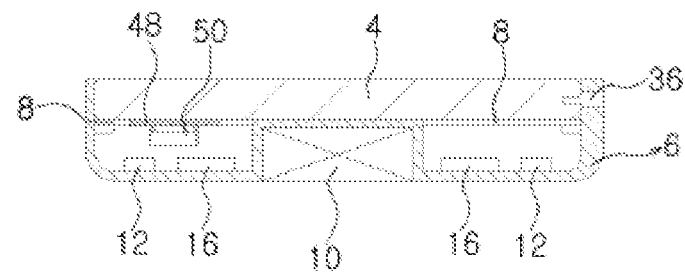
FIG. 3c is a diagram illustrating a radiant heat structure in the inner side of the protective case for a mobile terminal of the present invention.
Figure 3C:
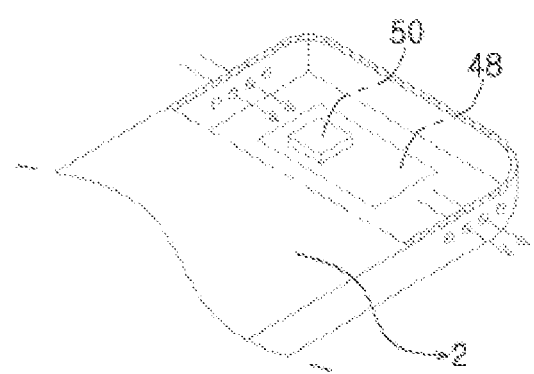

FIG. 3c shows a configuration for reducing heat generated when a multimedia function of the mobile terminal 4 is used.

In general, the mobile terminal 4 generates heat due to the excessive use of a CPU and GPU when a multimedia function, such as game or image, is used. As a result, the back part of the mobile terminal 4 becomes hot.

The mobile terminal 4 lowers the temperature of generated heat by reducing the functions of the CPU and the GPU when it is overheated to a specific temperature or more. The functions may include the stop of a specific function, control of brightness or resolution of a screen, etc.

The reduction in the functions of the mobile terminal 4 is an option for reducing generated heat, but there is a problem in that a user cannot use the entire performance of the mobile terminal 4 due to a function reduction, such as that described above, when the user is playing game or watching an image.

Referring to (a) of FIG. 3c, in the present invention, in order to lower heat generated by the mobile terminal 4 as described above, a radiant heat member 48 having good thermal conductivity is provided in the inner side of the protective case 2 for a mobile terminal close to the mobile terminal 4.

The radiant heat member 48 provided in the protective case 2 for a mobile terminal may be configured using graphene, graphite, carbon fiber, silver, copper, a ceramic heat sink, a thermal tape etc, in addition, any materials having good thermal conductivity may be used as the radiant heat member.

The radiant heat member 48 is advantageously provided at the location where the mobile terminal 4 generates heat, preferably, at the location where the CPU and the GPU are installed and the location where the protective case 2 for a mobile terminal is met.

In the present invention, a cooling part 50 for discharging heat transferred to the radiant heat member 48 may be installed over the radiant heat member 48 in the inner side of the protective case 2 for a mobile terminal in which the radiant heat member 48 has been installed.

The cooling part 50 may be a small-sized fan motor form. As in (b) of FIG. 3c, the cooling part is disposed over the radiant heat member 48, and can discharge from external inflow air to the radiant heat member 48 so that the air is discharged to the outside, thereby being capable of reducing heat generated by the mobile terminal 4. Accordingly, a multimedia function, such as game or image, can be used without a reduction in the function of the mobile terminal 4.

A cooling device using a piezoelectric element may be installed as another example of the cooling part 50. The cooling device using a piezoelectric element is suitable for being installed in the protective case 2 for a mobile terminal, which has a narrow installation space, because it can be installed at a minimized thickness.

Korean Registration Patent No. 10-1435899 "Single Actuator Cooling Jet Apparatus" may be used as the cooling device using a piezoelectric element.

Figure 8:
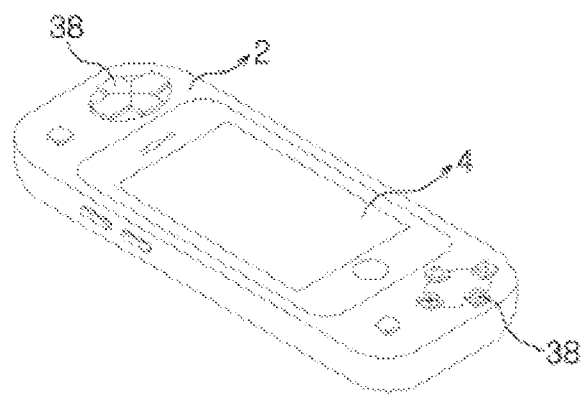
FIG. 8 is a diagram showing the configuration of a protective case for a mobile terminal according to another exemplary embodiment of the present invention.

FIG. 8 shows the configuration of the protective case 2 for a mobile terminal according to another an exemplary embodiment of the present invention. The protective case 2 for a mobile terminal of the present invention may include a manipulation button 38 for manipulating a multimedia function, such as game, when the multimedia function is driven.

In general, a game that may operate in a console game machine (for example, Sony PS and Nintendo Wii etc.,) trends to be now executed in the mobile terminal 4. Game for such a console game machine may required a separate manipulation button 38 in addition to a manipulation by a touch on a screen of the mobile terminal 4 because the game is complicated and difficult in its manipulation compared to game for a mobile terminal.

A manipulation using a touch on a screen of the mobile terminal 4 is inconvenient because it covers a game screen when a screen is touched. In particular, in the case of game having a complicated manipulation, it is difficult to perform the game by only a screen touch and a sense of a game manipulation by a touch is insufficient, thereby reducing a sense of immersion of the game.

In the present invention, for a manipulation of game executed in the mobile terminal 4, the at least one manipulation button 38 for a game manipulation may be provided on one side of the protective case 2 for a mobile terminal. The manipulation button 38 can manipulate game executed in the mobile terminal 4 by sending and receiving signals to and from the mobile terminal 4.

Figure 9:
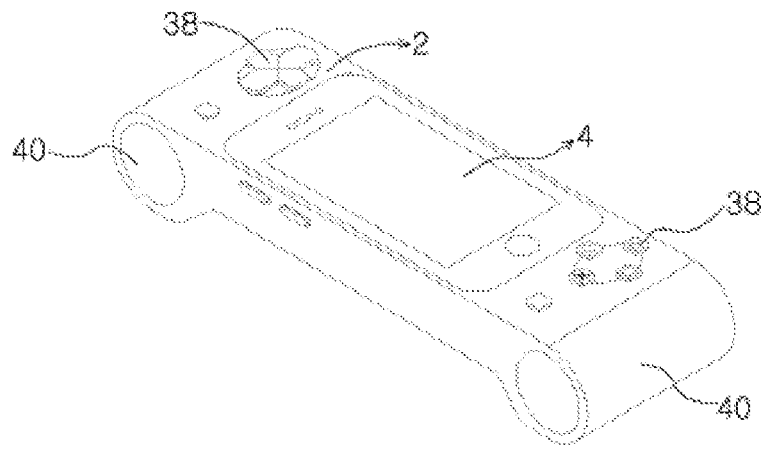
FIG. 9 is a diagram showing the configuration of a protective case for a mobile terminal according to another exemplary embodiment of the present invention.
Figure 10:
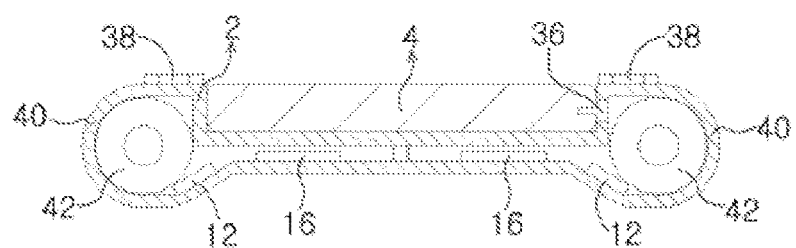
FIG. 10 shows the configuration of a cross-sectional view of FIG. 9, FIGS. 11 to 12 are operation block diagrams of the protective case for a mobile terminal according to various exemplary embodiments of the present invention.

FIGS. 9 to 10 show configurations of the protective case 2 for a mobile terminal according to an another embodiment of the present invention. Grip part 40 are formed on both sides of the protective case 2 for a mobile terminal of the present invention so that the protective case 2 for a mobile terminal can be easily held by both hands when a multimedia function, such as game, is driven.

When the protective case 2 for a mobile terminal is held by both hands, the grip parts 40 are protruded in a circle so that they can be closely attached to the palms. A sense of grip that touches the palms when game is manipulated is improved to facilitate a game manipulation.

In the present invention, a cylindrical battery 42 (dry cell) may be installed in the inner side of the grip part 40 in such a way as to be replaced. The battery 42 which can be easily purchased on the market and has high energy density can be practically used to supply power to the protective case 2 for a mobile terminal and also plays the role of the auxiliary power source of the mobile terminal 4.

Furthermore, the at least one actuator 12 may be installed on both sides of the grip part 40. The actuator 12 is installed on the side of the grip part 40 so that vibration feedback can be easily felt. Accordingly, a sense of realism can be improved because vibration is directly delivered to the palm.

In the present invention, vibration feedback is provided to a user by sending a signal of the mobile terminal 4 to the protective case 2 for a mobile terminal using wireless communication through Bluetooth.

Figure 11:
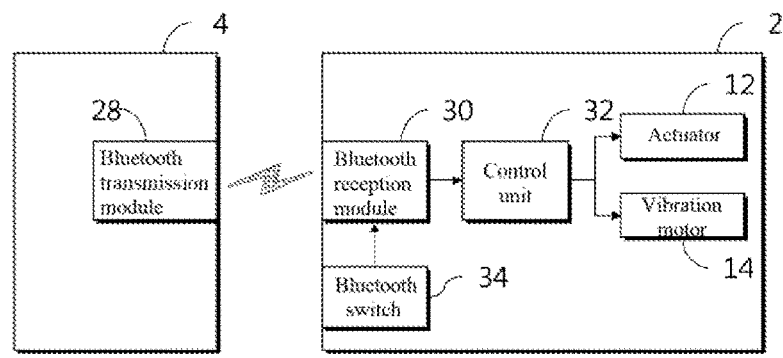

Referring to FIG. 11, in a preferred exemplary embodiment of the present invention, the mobile terminal 4 may be a smartphone. A Bluetooth reception module 30 which receives a radio signal transmitted by the Bluetooth transmission module 28 of the mobile terminal 4 is configured in the protective case 2 for a mobile terminal.

A signal is transmitted to the Bluetooth reception module 30 of the protective case 2 for a mobile terminal through the Bluetooth transmission module 28 of the mobile terminal 4. The transmitted signal can provide vibration feedback suitable for an image and sound to a user by controlling the actuator 12 and the vibration motor 14 through a control unit 32.

In this case, when the Bluetooth reception module 30 is not used, the auxiliary battery 10 of the protective case 2 may be discharged because the consumption of current is generated. Accordingly, a Bluetooth switch 34 capable of driving the Bluetooth reception module 30, if necessary, may be configured in the protective case 2 for a mobile terminal.

In the state in which a multimedia function, such as game, is not driven using the mobile terminal 4, that is, if the protective case 2 for a mobile terminal is used to protect damage to the mobile terminal 4, the state in which the Bluetooth reception module 30 is turned off is maintained in order to prevent the current consumption of the auxiliary battery 10.

If a haptic effect according to the operation of a multimedia function, such as game, is necessary, the transmission/reception of signals to/from the Bluetooth transmission module 28 of the mobile terminal 4 is required. Accordingly, the Bluetooth reception module 30 is turned on to receive a signal, so real-time vibration feedback can be provided to a user.

In the present invention, vibration feedback can be provided to a user by sending a signal output by the mobile terminal 4 to the protective case 2 for a mobile terminal through wired communication.

Figure 12:
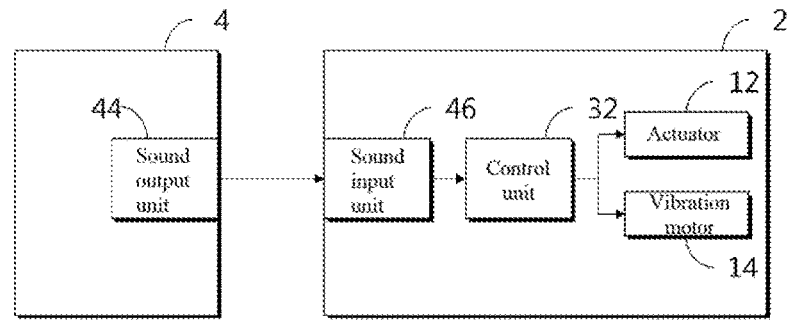

Referring to FIG. 12, in the present invention, a signal output through the sound output unit 44 of the mobile terminal 4 is transmitted to the sound input unit 46 of the protective case 2 for a mobile terminal using a wired cable. The transmitted signal is transmitted to the control unit 32 and converted into a vibration signal.

In a preferred exemplary embodiment of the present invention, the sound output unit 44 may be an earphone connection terminal of the mobile terminal 4 and the sound input unit 46 may be an earphone connection jack.

The control unit 32 amplifies a signal transmitted through the sound input unit 46, removes a signal of an unnecessary frequency band by filtering the amplified signal, converts the filtered signal into a vibration signal, and controls the actuator 12 and the vibration motor 14.

In the present invention, vibration feedback for a signal output by the mobile terminal 4 can be provided to a user through communication with the protective case 2 for a mobile terminal through the connector 36 for charging of the mobile terminal 4.

In an exemplary embodiment of the present invention, B,C type connector 36 may be used as the connector 36. The connector 36 is capable of data transmission along with power charging, and thus data communication with the protective case 2 for a mobile terminal is performed through the connector 36 when the mobile terminal 4 is charged.

In this case, the control unit 32 of the protective case 2 for a mobile terminal checks required data in the state in which it has been electrically connected to the mobile terminal 4 by the connector 36, receives data necessary for a haptic signal, that is, sound data, and generates a vibration signal.

The connector 36 is not limited to the B, C type connector 36 and may be any connector capable of power charging and data transmission.

Figure 13:
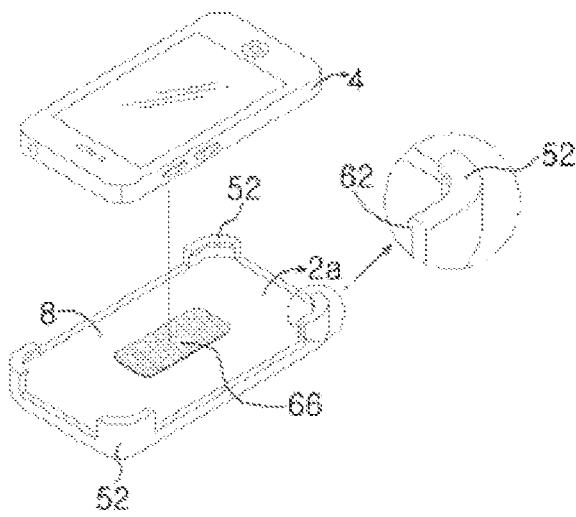
FIG. 13 is a diagram showing that fixing part are formed at the corners of the protective case for a mobile terminal according to an exemplary embodiment of the present invention.

FIG. 13 is another exemplary embodiment of the present invention. Only fixing parts 52 are formed in the corners of a protective case 2a for a mobile terminal, and thus the mobile terminal 4 can be inserted and fixed thereto. If only the corners of the mobile terminal 4 are inserted and fixed by the fixing parts 52, the coupling of the protective case 2a for a mobile terminal is easy, and it impresses that the mobile terminal 4 is slim in the state in which the protective case 2a for a mobile terminal has been coupled.

Figure 14:
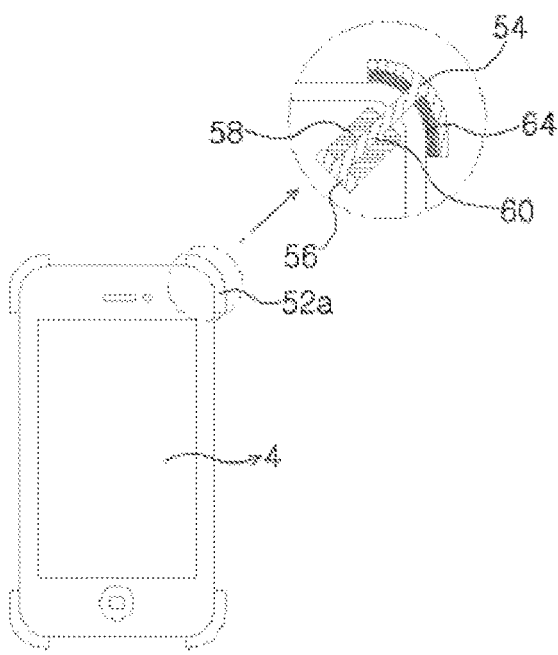
FIGS. 14 to 15 are diagrams showing that the fixing part is configured to be expanded.
Figure 15:
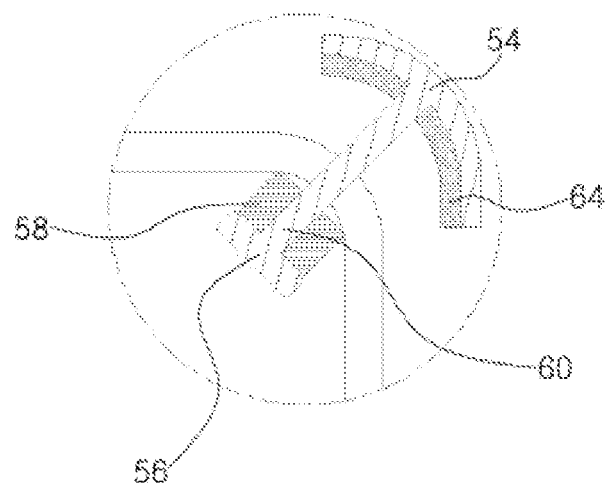

In another an exemplary embodiment of the present invention, as shown in FIGS. 14 to 15, extension part 52a may be formed at the corners of the protective case 2a for a mobile terminal of the present invention in such a way as to be extended so that they can be worn in the mobile terminal 4 of various sizes.

These days, the size of the mobile terminal 4, preferably, a smartphone is released in various ways by manufacturer and series. If a new mobile terminal 4 is released or newly purchased, the protective case 2a suitable for the size of the mobile terminal 4 has to be purchased again.

In the present invention, the protective case 2a can be applied to the mobile terminal 4 of various sizes by forming the extension parts 52a at the corners of the protective case 2a for a mobile terminal so that the extension parts 52a are adapted to the size of the mobile terminal 4 and worn thereon.

The extension part 52a is configured to include a guide part 54 surrounding the corner of the mobile terminal 4 to fix the protective case 2a when the protective case 2a is worn, a trapping piece 56 connected to the guide part 54 for preventing detachment of the guide part 54 in the inner side of the protective case 2a for a mobile terminal, and an elastic part 58 enabling the guide part 54 to be expanded in the state in which the trapping piece 56 has been engaged with the elastic part.

In a preferred exemplary embodiment of the present invention, the four guide parts 54 may be formed to surround the respective corners of the mobile terminal 4. Two guide parts 54 adjacent to each other are first inserted into the mobile terminal 4, and the remaining two guide parts 54 are then externally extended and inserted and fixed to the mobile terminal 4.

A protrusion piece 62 for fixing the inserted mobile terminal 4 so that it does not easily fall out is formed at the end of the guide part 54. The protrusion piece 62 holds each of the corners of the mobile terminal 4 inserted into the protective case 2a for a mobile terminal so that the mobile terminal 4 does not deviate from the protective case 2a.

An elastic member 64 may be formed on a surface of the guide part 54 that is the inside of the guide part 54 and that comes into contact with the mobile terminal 4 in order to prevent damage to each of the corners of the mobile terminal 4. The elastic member 64 plays the role of a buffer material when the mobile terminal 4 drops and collides against the ground, and thus can prevent damage to the mobile terminal 4.

The trapping piece 56 connected to the guide part 54 by a shaft 60 becomes a trapping state in the inner side of the protective case 2 and thus does not deviate. The elastic part 58 is provided in the shaft 60, so the guide part 54 can be installed to be expandable.

The elastic part 58 may be any materials having an elastic force. For example, a spring may be provided on the outside of the shaft 60, and thus the guide part 54 can have elasticity by the elastic force of the spring.

The guide part 54 that fix the protective case 2a by surrounding the corners of the mobile terminal 4 may be fixed with an adhesive force by the elastic part 58. As the guide part 54 can be expanded by the elastic force, the mobile terminal 4 can be inserted and fixed to the protective case 2a although it has a different size.

Referring back to FIG. 13, in the present invention, a silicon sheet 66 for preventing the sliding of the mobile terminal 4 may be provided on the cover 8 of the protective case 2, 2a for a mobile terminal, which is brought into contact with the mobile terminal 4 and combined therewith.

The silicon sheet 66 is a material having a horizontal tackiness and high friction force. If the protective case 2, 2a for a mobile terminal falls in the state in which the mobile terminal 4 has been inserted into the protective case, the mobile terminal 4 is fixed to its regular position by the silicon sheet 66 without leaning in the falling direction. Accordingly, a falling impact can be distributed to the entire mobile terminal 4 because the center of weight is not concentrated on one side.

In particular, as in FIGS. 13 to 15, if the mobile terminal 4 falls in the state in which only the corners of the mobile terminal 4 have been fixed, the mobile terminal 4 can be certainly fixed by the protective case 2a for a mobile terminal. Accordingly, a phenomenon in which the center of weight of the mobile terminal 4 leans when the mobile terminal falls will be further increased.

Accordingly, the silicon sheet 66 prevents the phenomenon in which the mobile terminal 4 leans, and thus can reduce damage to the mobile terminal 4 by distributing an impact applied to the corners of the mobile terminal when a falling impact is applied to the mobile terminal. Furthermore, the silicon sheet 66 can prevent the mobile terminal 4 from deviating from the protective case 2a for a mobile terminal.

In an exemplary embodiment of the present invention, the silicon sheet 66 may be formed using an adhesive rubber or adhesive sheet material.

As described above, as the actuator 12, which provides real-time vibration feedback, is installed in the inner side of the protective case 2 which is worn for preventing damage to the mobile terminal 4, the protective case has an effect of giving a user simultaneous sensory stimulation by providing the user with a haptic signal corresponding to an image and sound outputted from the mobile terminal 4 as a rapid vibration response.

Furthermore, the protective case can transfer various vibration patterns including strong vibration and micro vibration as the vibration amount of the actuator 12 is adjusted according to the magnitude of vibration, or a vibration motor 14 is controlled so as to provide vibration feedback at low frequency, and thus, the protective case has an effect of giving the user a sense of realism.

Furthermore, there is an effect in that the continuous operation of a multimedia function, such as online game, is possible because the auxiliary battery can be replaced in the state in which the operation of the mobile terminal 4 is maintained when the battery is used up.

Furthermore, there is an effect in that a multimedia function can be used without a reduction in the function of a mobile terminal because the radiant heat member 48 and the cooling part 50 for reducing heat generated by the mobile terminal 4 is installed in the inner side of the protective case 2 for a mobile terminal.

Although the detailed exemplary embodiments have been described in the description of the present invention, several modifications may be made without departing from the range of the present invention. Accordingly, the range of the present invention should not be determined based on the aforementioned embodiments, but should be determined by the claims and equivalents thereof.

The protective case for a mobile terminal of the present invention may be combined with a mobile terminal providing a multimedia function, such as a smartphone and a portable game machine, etc., and used to provide a real-time vibration haptic signal.

What is claimed is:

1. A protective case for a mobile terminal providing real-time vibration feedback, the protective case comprising:
   an actuator (12) comprising a piezoelectric vibrating screen (17) formed by attaching a piezoelectric element layer (20) to at least one side of a substrate (18), at least one or more weight piece (22) which are fixedly attached to the piezoelectric vibrating screen (17) and increase a vibration force and a bracket (24) provided so that both ends of the substrate (18) are fixedly attached thereto;
   an auxiliary battery (10) which supplies power to the actuator (12) and is used for charging in case a battery of the mobile terminal (4) is discharged or consumed; and
   a Bluetooth receiving module (30) for receiving a signal transmitted form a Bluetooth transmitting module (28) of the mobile terminal (4).

2. A protective case for a mobile terminal providing real-time vibration feedback, the protective case comprising:
   an actuator (12) comprising a piezoelectric vibrating screen (17) formed by attaching a piezoelectric element layer (20) to at least one side of a substrate (18), at least one or more weight piece (22) which are fixedly attached to the piezoelectric vibrating screen (17) and increase a vibration force and a bracket (24) provided so that both ends of the substrate (18) are fixedly attached thereto;
   an auxiliary battery (10) which supplies power to the actuator (12) and is used for charging in case a battery of the mobile terminal (4) is discharged or consumed; and
   a sound input unit (46) receiving a signal transmitted from a sound output unit (44) of the mobile terminal (4).

3. A protective case for a mobile terminal providing real-time vibration feedback, the protective case comprising:
   an actuator (12) comprising a piezoelectric vibrating screen (17) formed by attaching a piezoelectric element layer (20) to at least one side of a substrate (18), at least one or more weight piece (22) which are fixedly attached to the piezoelectric vibrating screen (17) and increase a vibration force and a bracket (24) provided so that both ends of the substrate (18) are fixedly attached thereto;

an auxiliary battery (10) which supplies power to the actuator (12) and is used for charging in case a battery of the mobile terminal (4) is discharged or consumed; and a connector (36) for changing an internal battery of the mobile terminal (4) and for transmitting data between a protective case(2, 2a)for a mobile terminal and the mobile terminal (4).

4. The protective case for mobile terminal providing real-time vibration feedback of any one of claims 1 to 3, further comprising a vibration motor (14) providing vibration using eccentricity in order to transfer slow vibration in a low frequency band.

5. The protective case for mobile terminal providing real-time vibration feedback of claim 4, wherein the vibration motor (14) is any one of a rotary type vibration motor and a linear vibration motor.

6. The protective case for mobile terminal providing real-time vibration feedback of any one of claims 1 to 3, further comprising a control unit (32) converting a signal transmitted by the mobile terminal (4) into a vibration signal.

7. The protective case for mobile terminal providing real-time vibration feedback of any one of claims 1 to 3, wherein the actuator (12) comprises a case (26) to surround the actuator (12) in order to increase a vibration force, reduce vibration noise, and damage attributable to falling impact.

8. The protective case for mobile terminal providing real-time vibration feedback of claim 7, wherein the case (26) is formed using any one of natural rubber, synthetic rubber and synthetic resin.

9. The protective case for mobile terminal providing real-time vibration feedback of any one of claims 1 to 3, wherein the weight piece (22) is configured to be attached and fixed on one side or both sides of the piezoelectric vibrating body (17).

10. The protective case for mobile terminal providing real-time vibration feedback of any one of claims 1 to 3, wherein the actuator (12) is vibration devices consisting of piezoelectric element having any one of unimorph type, bimorph type and multi-morph type.

11. The protective case for mobile terminal providing real-time vibration feedback of any one of claims 1 to 3, wherein at least one insertion groove for inserting and installing the actuator (12) is formed in the protective case (2, 2a) for the mobile terminal (4).

12. The protective case for mobile terminal providing real-time vibration feedback of any one of claims 1 to 3, wherein the actuator (12) is installed in the protective case (2, 2a) for the mobile terminal for a stereoscopic effect according to multiple vibration and is at least one.

13. The protective case for mobile terminal providing real-time vibration feedback of any one of claims 1 to 3, further comprising a module case having the actuator (12) inserted and installed in an inner side of the protective case (2, 2a) to prevent damage to the actuator (12) attributable to falling impact.

14. The protective case for mobile terminal providing real-time vibration feedback of any one of claims 1 to 3, wherein the auxiliary battery (10) installed in the protective case (2, 2a) for a mobile terminal is installed to be replaceable.

15. The protective case for mobile terminal providing real-time vibration feedback of any one of claims 1 to 3, wherein the protective case (2) for a mobile terminal comprises a manipulation button (38).

16. The protective case for mobile terminal providing real-time vibration feedback of any one of claims 1 to 3, wherein grip part (40) is formed on both sides of the protective case (2) for a mobile terminal.

17. The protective case for mobile terminal providing real-time vibration feedback of claim 16, wherein a battery (42) supplying power to the protective case (2) for a mobile terminal and used as an auxiliary power source of the mobile terminal (4) is installed in an inner side of the grip part (40).

18. The protective case for mobile terminal providing real-time vibration feedback of claim 17, wherein the battery (42) is installed to be replaceable.

19. The protective case for mobile terminal providing real-time vibration feedback of any one of claims 1 to 3, wherein a radiant heat member (48) being close to the mobile terminal (4) and discharging heat and a cooling part (50) discharging heat transferred to the radiant heat member (48) are configured in the protective case (2, 2a) for a mobile terminal.

20. The protective case for mobile terminal providing real-time vibration feedback of any one of claims 1 to 3, wherein fixing part (52) for fixing an insertion and fixing of the mobile terminal (4) is formed at corners of the protective case (2a) for a mobile terminal.

21. The protective case for mobile terminal providing real-time vibration feedback of any one of claims 1 to 3, wherein extension part (52a) installed to be extensible in order to couple the protective case (2a) to the mobile terminal (4) of various sizes is formed at corners of the protective case (2a) for a mobile terminal.

22. The protective case for mobile terminal providing real-time vibration feedback of claim 21, wherein the extension part (52a) comprises:

a guide part (54) surrounding the corner of the mobile terminal (4) to fix the mobile terminal (4) the protective case (2a), a trapping piece (56) connected to the guide part (54) and preventing a detachment of the guide part (54) from an inner side of the protective case (2a) for a mobile terminal, and an elastic part (58) enabling the guide part (54) to be expanded in a state in which the trapping piece (56) has been engaged with the elastic part (58).

23. The protective case for mobile terminal providing real-time vibration feedback of claim 22, wherein an elastic member (64) is formed in an inner side of the guide part (54) in order to prevent damage to the mobile terminal (4).

24. The protective case of any one of claims 1 to 3, wherein a silicon sheet (66) for preventing a center of weight of the mobile terminal (4) from being concentrated on corners of the protective case (2, 2a) when the mobile terminal (4) falls is provided on the cover (8) for the mobile terminal (4) which comes into contact with the mobile terminal (4).

* * * * *